United States Patent
Moribe et al.

(10) Patent No.: US 10,523,844 B2
(45) Date of Patent: Dec. 31, 2019

(54) IMAGE PROCESSING APPARATUS AND IMAGE PROCESSING METHOD FOR IMAGE SHARPNESS RECOVERY

(71) Applicant: CANON KABUSHIKI KAISHA, Tokyo (JP)

(72) Inventors: Shoei Moribe, Tokyo (JP); Yusuke Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/019,879

(22) Filed: Jun. 27, 2018

(65) Prior Publication Data
US 2019/0007580 A1    Jan. 3, 2019

(30) Foreign Application Priority Data
Jun. 28, 2017   (JP) ................. 2017-126513

(51) Int. Cl.
| H04N 1/405 | (2006.01) |
| H04N 1/60 | (2006.01) |
| H04N 1/409 | (2006.01) |
| B41J 2/21 | (2006.01) |

(52) U.S. Cl.
CPC ............ *H04N 1/405* (2013.01); *B41J 2/2146* (2013.01); *H04N 1/4092* (2013.01); *H04N 1/605* (2013.01)

(58) Field of Classification Search
CPC ...... H04N 1/405; H04N 1/4092; H04N 1/407; H04N 1/605; B41J 2/2146
USPC ......................... 358/1.1–1.18, 1.9, 3.06, 534
See application file for complete search history.

(56) References Cited

U.S. PATENT DOCUMENTS

| 9,734,439 B2 | 8/2017 | Hara et al. |
| 9,894,250 B2 | 2/2018 | Moribe |
| 10,026,156 B2 | 7/2018 | Moribe |
| 10,043,118 B2 | 8/2018 | Sumi et al. |
| 2010/0302562 A1 | 12/2010 | Bonnier et al. |
| 2016/0352956 A1 | 12/2016 | Shimokodachi et al. |

(Continued)

FOREIGN PATENT DOCUMENTS

| JP | 2006033225 A | 2/2006 |
| JP | 2011024049 A | 2/2011 |
| WO | 2016194313 A1 | 12/2016 |

OTHER PUBLICATIONS

Extended European search report issued in corresponding application No. 18176316.0 dated Nov. 23, 2018, 9 pages.

*Primary Examiner* — Gabriel I Garcia
(74) *Attorney, Agent, or Firm* — Carter, DeLuca & Farrell LLP

(57) ABSTRACT

To implement sharpness recovery processing suitable for an image, an image processing apparatus for generating, based on an input image, a halftone image to be provided to an image forming unit which forms an image on a printing medium, comprises: a recovery processing unit configured to perform, on the input image, recovery processing for compensating for sharpness degradation in an image formed by the image forming unit; a generating unit configured to generate a recovery amount of each pixel by using the input image having undergone the recovery processing; and a halftone processing unit configured to generate, based on the recovery amount, the halftone image by performing halftone processing on the input image having undergone the recovery processing.

21 Claims, 11 Drawing Sheets

(56) References Cited

U.S. PATENT DOCUMENTS

| | | |
|---|---|---|
| 2017/0111548 A1 | 4/2017 | Yamamoto et al. |
| 2017/0310851 A1 | 10/2017 | Dobashi et al. |
| 2018/0013920 A1* | 1/2018 | Dobashi .................. H04N 1/58 |
| 2018/0262649 A1 | 9/2018 | Shimada et al. |
| 2018/0295258 A1 | 10/2018 | Ochiai et al. |
| 2018/0324327 A1 | 11/2018 | Moribe et al. |
| 2018/0359387 A1* | 12/2018 | Otani .................. H04N 1/4092 |

* cited by examiner

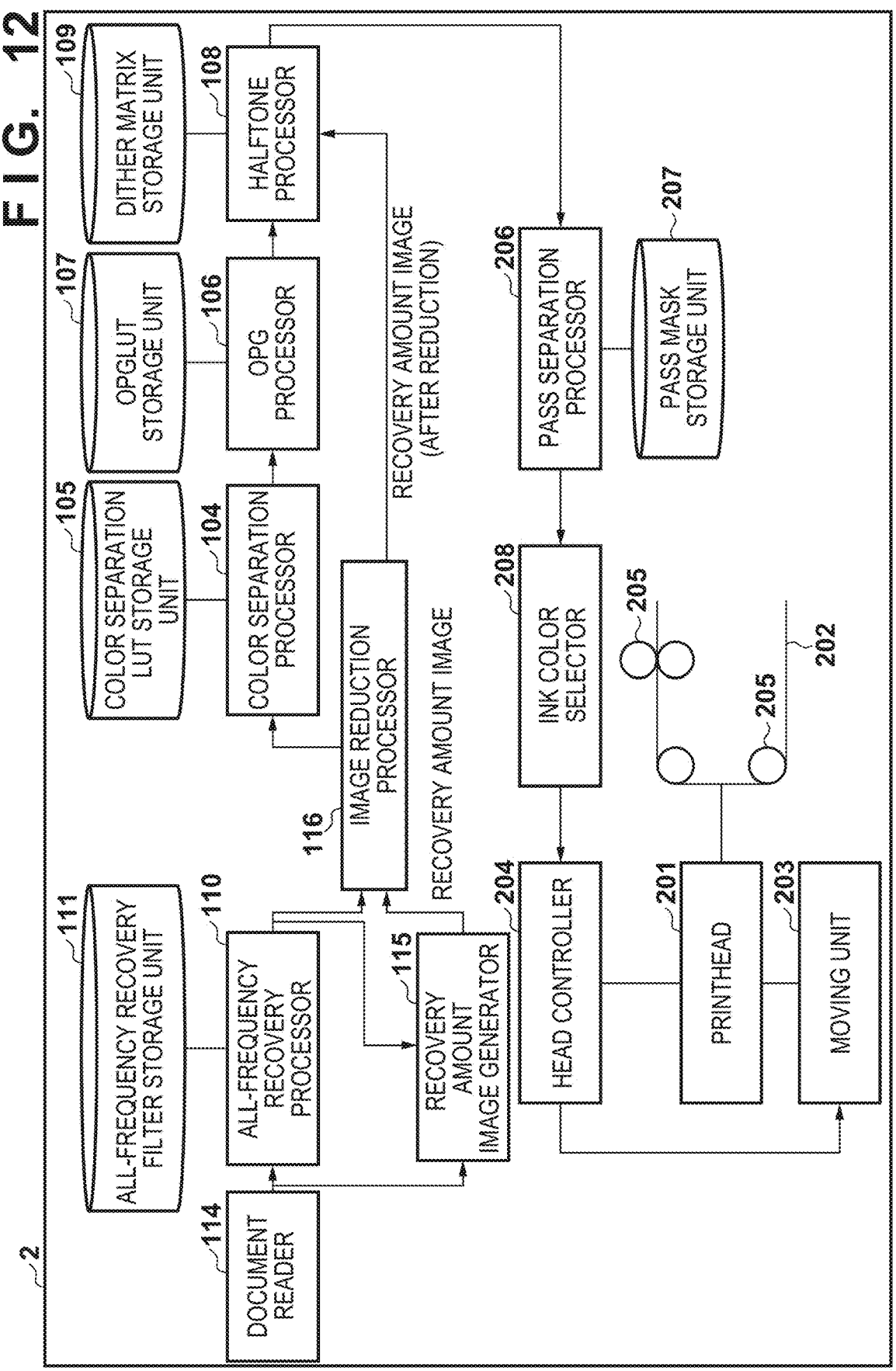

IMAGE PROCESSING APPARATUS AND IMAGE PROCESSING METHOD FOR IMAGE SHARPNESS RECOVERY

BACKGROUND OF THE INVENTION

Field of the Invention

The present invention relates to image sharpness recovery processing.

Description of the Related Art

The sharpness of an image output from an image forming apparatus such as an inkjet printer degrades compared to that of an input image due to, for example, a shift of an ink landing position, ink smear (a mechanical dot gain), or optical blur (an optical dot gain). In this case, if the frequency characteristics of an output image can be obtained in advance, the sharpness degradation can be compensated for by performing convolution processing (sharpness recovery processing) on an input image by using a filter having the reverse characteristics. However, if this sharpness recovery processing is performed on an input image in an image forming apparatus such as an inkjet printer by using the filter having the reverse characteristics, the brightness decreases in a higher-frequency region.

Japanese Patent Laid-Open No. 2011-24049 (patent literature 1) discloses a technique which premeasures a brightness change amount before and after the processing and corrects the luminance value by the change amount measured for each pixel of an input image. Also, Japanese Patent Laid-Open No. 2006-33225 (patent literature 2) describes a technique which suppresses a break of a thin line and an edge loss by decreasing the threshold of a dither matrix based on the edge intensity and edge direction detected from an input image.

Unfortunately, the brightness change amount before and after the sharpness recovery processing changes in accordance with an image feature amount such as an average density. In the technique described in patent literature 1, therefore, the change amount must be measured for each image feature amount. Also, the technique described in patent literature 2 is processing focused on only the edge portion, and hence cannot compensate for frequency characteristic degradation in portions other than the edge portion. In addition, an appropriate correction amount in the edge portion is unknown, so overcorrection or insufficient correction may occur.

SUMMARY OF THE INVENTION

According to one aspect of the present invention, an image processing apparatus for generating, based on an input image, a halftone image to be provided to an image forming unit which forms an image on a printing medium, comprises: a recovery processing unit configured to perform, on the input image, recovery processing for compensating for sharpness degradation in an image formed by the image forming unit; a generating unit configured to generate a recovery amount of each pixel by using the input image having undergone the recovery processing; and a halftone processing unit configured to generate, based on the recovery amount, the halftone image by performing halftone processing on the input image having undergone the recovery processing.

The present invention provides a technique capable of implementing sharpness recovery processing suited for an image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a block diagram showing the configuration of an image forming apparatus according to the fourth embodiment.

DESCRIPTION OF THE EMBODIMENTS

Embodiments of the present invention will be explained in detail below with reference to the accompanying drawings. Note that the following embodiments are merely examples and are not intended to limit the scope of the invention.

First Embodiment

The first embodiment of an image processing apparatus according to the present invention will be explained below by taking, as an example, an image processing apparatus which generates data (an ink value image) for use in an inkjet printer. In particular, an example in which a lower frequency which is visually important is compensated for by filter processing and a higher frequency is compensated for by dot arrangement control in relation to sharpness recovery will be explained.

<Apparatus Configuration>

Figure 1:
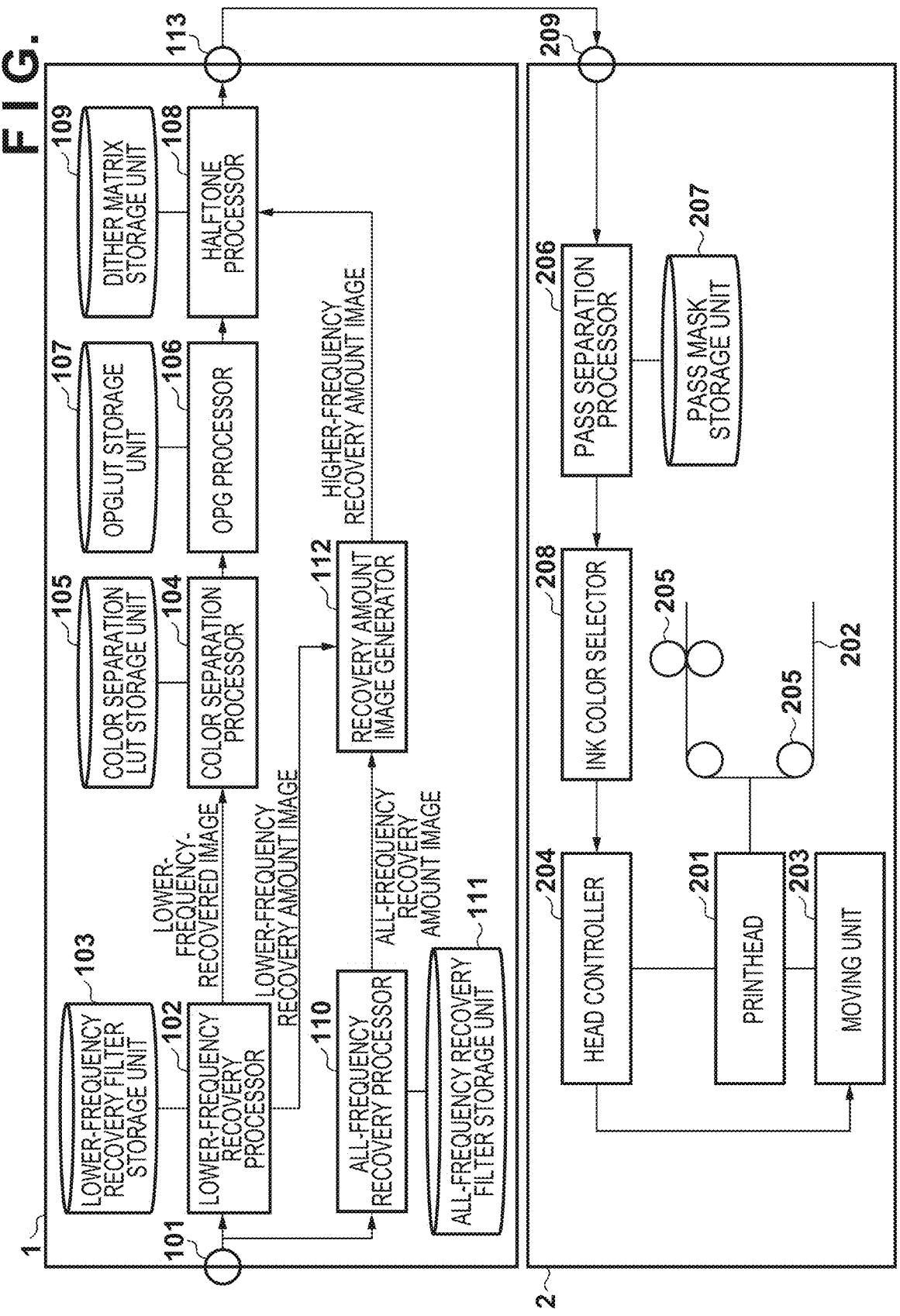
FIG. 1 is a block diagram showing the configuration of an image forming system according to the first embodiment.

FIG. 1 is a block diagram showing the configuration of an image forming system according to the first embodiment. This image forming system includes an image processing apparatus 1 and a printer 2. Note that the image processing apparatus 1 can be implemented by, for example, a printer driver which is executed in a general personal computer. In this case, each unit of the image processing apparatus 1 is implemented by the computer by executing a predetermined program.

The image processing apparatus 1 and printer 2 are connected via a printer interface such that they can communicate with each other by wireless or wired communication. Note that FIG. 1 shows the image processing apparatus 1 and printer 2 as discrete units, but they may also be an integrated unit. For example, the printer 2 may also include the image processing apparatus 1. An input terminal 101 is an interface for obtaining image data to be printed. In this embodiment, it is assumed that the image data is an RGB color image containing eight bits for each color.

A lower-frequency recovery processor 102 performs lower-frequency recovery processing for input RGB image data. This lower-frequency recovery processing is sharpness recovery processing to be mainly performed on lower-frequency components lower than a predetermined frequency. More specifically, a lower-frequency recovery filter stored in a lower-frequency recovery filter storage unit 103 is obtained, and lower-frequency components are compensated for by convolution to the luminance value of an input image. In this embodiment, it is assumed that an 11×11-sized filter is used as the lower-frequency recovery filter. A method of forming the lower-frequency recovery filter will be described later.

A color separation processor 104 generates an ink value image having one or more color planes which the printer 2 uses, from the image data corrected by the lower-frequency recovery processor 102. In this embodiment, a printhead 201 of the printer 2 uses inks of four colors, that is, cyan (C), magenta (M), yellow (Y), and black (K). Therefore, the color separation processor 104 generates an 8-bit ink value image having four planes corresponding to the 4-color inks. More specifically, the 4-plane, 8-bit ink value image is generated by referring to a three-dimensional color separation lookup table (LUT) stored in a color separation LUT storage unit 105. For example, the color separation LUT is a table describing the ink values of the four colors on lattice points thinned to 17×17×17 points. Values between the lattice points are calculated by linear interpolation or the like.

An output gamma (OPG) processor 106 performs gamma correction processing on the ink value image generated by the color separation processor 104. More specifically, gamma correction is performed by referring to a one-dimensional OPGLUT stored in an OPGLUT storage unit 107. The values of the OPGLUT are preset for each ink type so that the brightness of a printed product linearly changes with respect to the signal value of the ink value image when printing is performed using only the inks of C, M, Y, and K. Note that L* defined by CIELAB can be used as a brightness evaluation value.

A halftone processor 108 converts the ink value image of each color obtained by the OPG processor 106 into a halftone image. More specifically, the ink value image is converted into binary image data (or an image having the number of tones equal to or larger than two values and smaller than the number of input tones). A known dither matrix method is used as the method of this halftone processing. The halftone processing is performed by referring to a dither matrix stored in a dither matrix storage unit 109 and a recovery amount image obtained from a recovery amount image generator 112 (to be described later). Details of the halftone processing will be described later. The generated binary image data is transmitted to an input terminal 209 of the printer 2 via an output terminal 113.

An all-frequency recovery processor 110 performs all-frequency recovery processing on the input RGB image data. In this embodiment, the all-frequency recovery processing is sharpness recovery processing for all image frequency components (all-frequency components). More specifically, an all-frequency recovery filter stored in an all-frequency recovery filter storage unit 111 is obtained, and all-frequency components are compensated for by convolution to the luminance value of an input image. In this embodiment, it is assumed that an 11×11-sized filter is used as the all-frequency recovery filter. A method of forming the all-frequency recovery filter will be described later.

The recovery amount image generator 112 generates a higher-frequency-component recovery amount image to be used in the halftone processing. More specifically, the higher-frequency-component recovery amount image is generated by calculating the difference between the image data corrected by the lower-frequency recovery processor 102 and the image data corrected by the all-frequency recovery processor 110. The generated recovery amount image is transmitted to the above-described halftone processor 108.

The printer 2 forms the binary image data (halftone image) provided from the image processing apparatus 1 on a printing medium 202 by moving the printhead 201 lengthwise and widthwise relative to the printing medium 202. As described previously, assume that image formation is performed by the inkjet method in this embodiment.

The printhead 201 discharges inks from a plurality of printing elements (nozzles). In this embodiment, a color image is formed on a printing medium by discharging inks of four colors, that is, cyan (C), magenta (M), yellow (Y), and black (K) from the printhead 201. A moving unit 203 moves the printhead 201 under the control of a head controller 204. A conveyor unit 205 conveys the printing medium 202 such as a sheet of paper under the control of the head controller 204. Note that this embodiment adopts a multipass printing method which forms an image on the printing medium 202 by performing printing scan a plurality of times by the printhead 201.

A pass separation processor 206 generates scan data of each color based on the binary image data of the color and a pass mask obtained from a pass mask storage unit 207. The scan data is a pattern to be printed in each printing scan by nozzles divided into a plurality of groups. Printing positions in the scan data have a complementary relationship, and printing of a whole region is completed by overlapping patterns of all the nozzle groups. Whenever printing scan of each pass is complete, the printing medium is conveyed by the width of each of the plurality of divided nozzle groups. An ink color selector 208 selects a corresponding ink from the ink colors loaded in the printhead 201 based on the scan data.

<Overall Operation of Apparatus>

Figure 2:
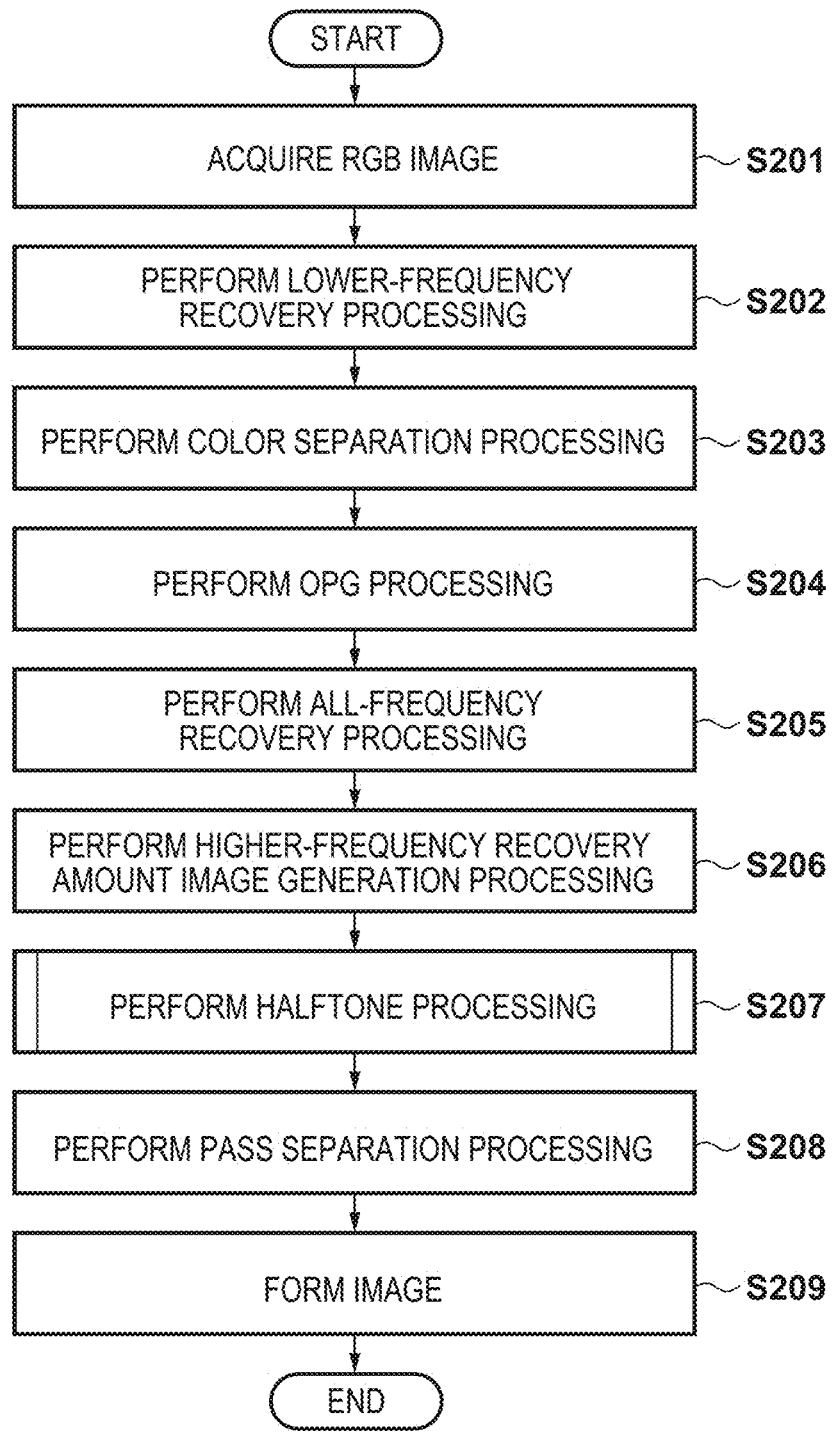
FIG. 2 is an overall flowchart of image processing in the first embodiment.

FIG. 2 is an overall flowchart of image processing in the first embodiment. In the following flowchart, each step will be represented by symbol S. This image processing is started by inputting an RGB image to the image processing apparatus 1 via the input terminal 101 (step S201).

In step S202, the lower-frequency recovery processor 102 performs the lower-frequency recovery processing on the input image. This lower-frequency recovery processing is performed by using the two-dimensional filter stored in the lower-frequency recovery filter storage unit 103. In step S203, the color separation processor 104 generates ink value images of C, M, Y, and K from the image data corrected by the lower-frequency recovery processor 102. This color separation processing is performed by referring to the three-dimensional color separation LUT stored in the color separation LUT storage unit 105. In step S204, the OPG processor 106 performs the gamma correction processing on the ink value images generated by the color separation processor 104.

In step S205, the all-frequency recovery processor 110 performs the all-frequency recovery processing on the input image. This all-frequency recovery processing is performed by using the two-dimensional filter stored in the all-frequency recovery filter storage unit 111. In step S206, the recovery amount image generator 112 performs the recovery amount image generation processing. In this recovery amount image generation processing, a higher-frequency-component recovery amount image is generated based on the difference between the image data corrected by the all-frequency recovery processor 110 and the image data corrected by the lower-frequency recovery processor 102.

In step S207, the halftone processor 108 performs the halftone processing of converting the data having undergone the OPG processing into binary data. This halftone processing is performed by referring to the dither matrix stored in the dither matrix storage unit 109 and the recovery amount image obtained from the recovery amount image generator 112. Details of the operation will be described later with reference to FIG. 6. The binary image data generated by the halftone processing is output from the output terminal 113 by an arbitrary size such as the whole image or the band width of each unit printing region.

In step S208, the pass separation processor 206 performs the pass separation processing of converting the binary image data input via the input terminal 209 into scan data. In step S209, the printer 2 performs image formation based on the scan data. More specifically, the ink color selector 208 selects an ink color matching the scan data, and the head controller 204 prints an image on the printing medium 202 by driving each nozzle at a predetermined driving interval while moving the printhead 201 with respect to the printing medium 202. The head controller 204 also conveys the printing medium 202 by a predetermined conveyance amount for each scan.

<Principle of Brightness Decrease by Reverse Filter Processing and Measure>

Figure 4:
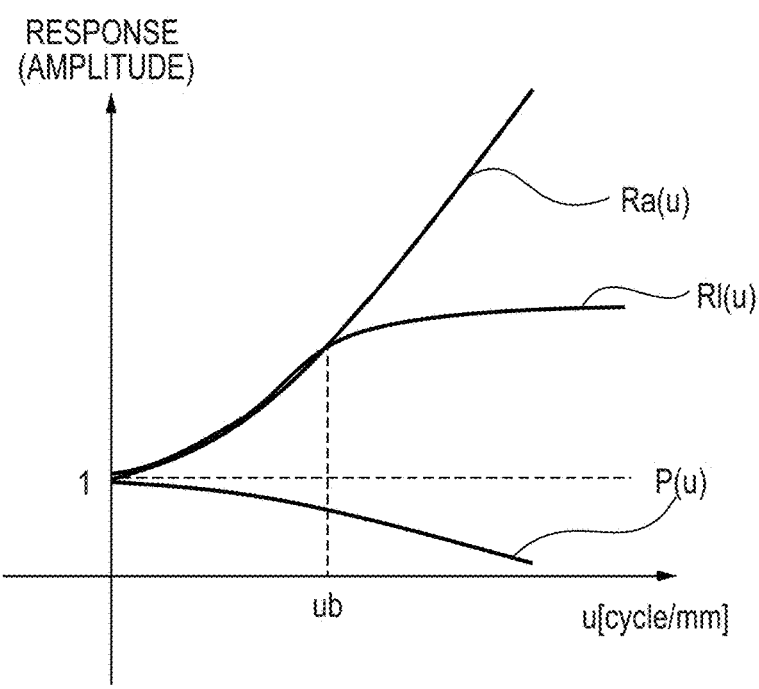
FIG. 4 is a graph for explaining the frequency characteristics of a filter.

First, the problem of the sharpness recovery processing caused by performing the reverse filter processing on all frequencies of an image will be explained, and the operation of the first embodiment as a measure will be explained. In an image forming apparatus such as a printer, the sharpness of an output image degrades due to a dot position fluctuation or smear. If frequency characteristics P(u) of an output image at a spatial frequency u can be obtained, an image having a suppressed sharpness degradation can expectedly be obtained by using an all-frequency recovery filter Ra(u) having the reverse characteristics (that is, 1/P(u)) of P(u). FIG. 4 exemplarily shows P(u) and Ra(u). Details of the frequency characteristics P(u) of an output image will be described later.

In practice, however, the average brightness in a higher-frequency region decreases when using the all-frequency recovery filter Ra(u). The brightness decreases because the average output density value is raised by the output gamma correction processing performed after the sharpness recovery processing.

Figure 5A:
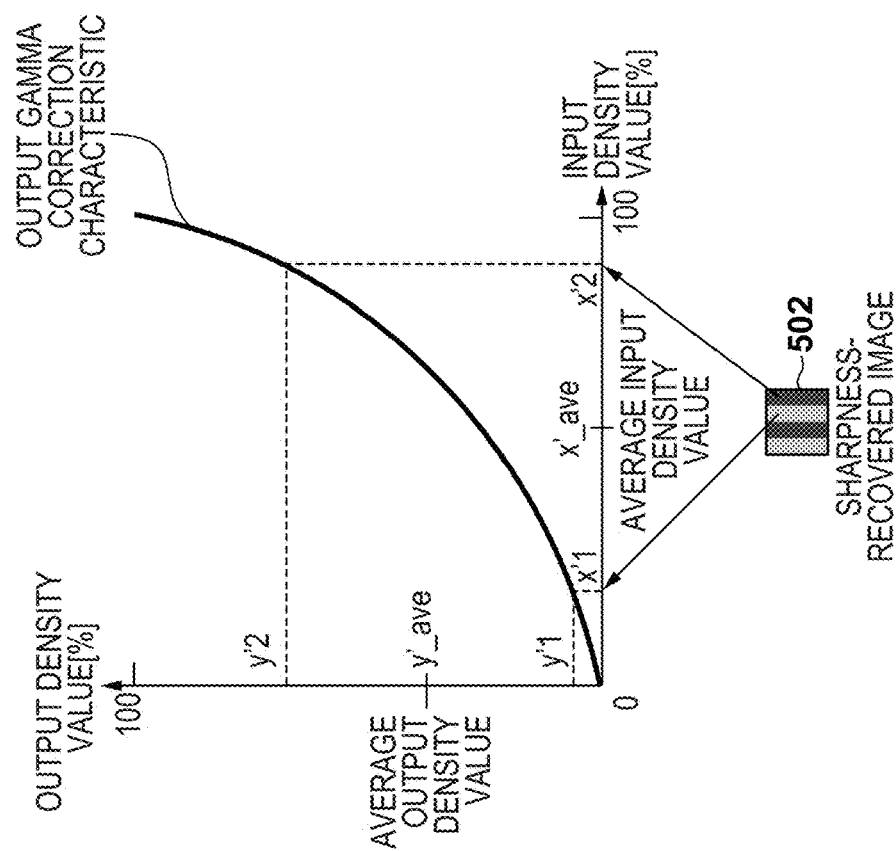
FIGS. 5A and 5B are graphs for explaining the rise of an average output density value in output gamma correction.
Figure 5B:
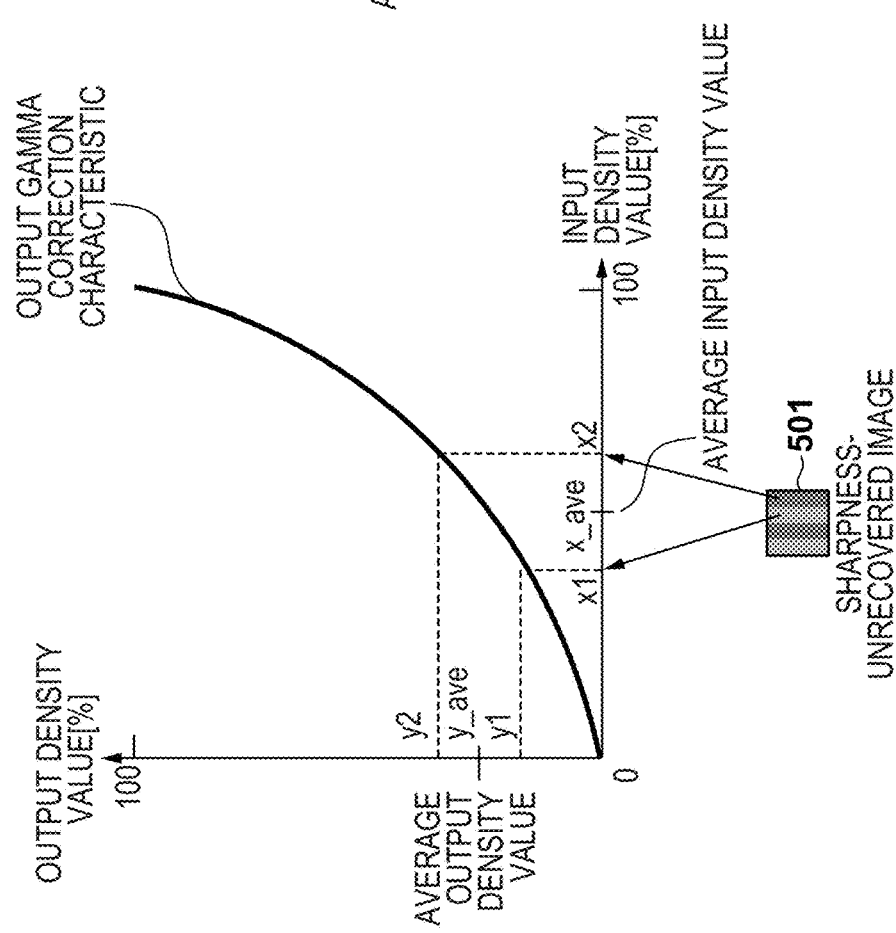

In the following description, the cause of this brightness decrease by the output gamma correction processing will be explained. To simplify the explanation, the explanation will be made by taking a rectangular-wave image containing two types of pixel values as an example. FIGS. 5A and 5B are graphs for explaining the rise of the average output density value (the brightness decrease) caused by output gamma correction. An image 501 in the lower portion of FIG. 5A indicates an image before the recovery processing. When the output gamma correction processing is performed on pixel values x1 and x2 of this image, output density values after this output gamma correction are y1 and y2, and their average value is y_ave.

An image 502 in the lower portion of FIG. 5B indicates an image after the recovery processing. When the recovery processing is performed, the contrast is enhanced while the average value of the input image is held. When the output gamma correction processing is performed on pixel values x'1 and x'2 of this image, output density values after this output gamma correction are y'1 and y'2, and their average value is y'_ave. The output gamma correction characteristic of a printer is generally a nonlinear shape projecting downward. Accordingly, y'_ave>y_ave even when x_ave=x'_ave. This rise of the average output density value increases in accordance with the recovery amount of the recovery processing. Since the characteristic of a sharpness recovery filter of a printer is as indicated by Ra(u) in FIG. 4, the brightness decreases more in a formed image in a higher-frequency region requiring a large recovery amount.

In the first embodiment, therefore, a lower-frequency region is first compensated for by using a lower-frequency recovery filter which suppresses higher-frequency recovery as indicated by Rl(u) in FIG. 4. After that, a higher-frequency region is compensated for by controlling the dot arrangement in the halftone processing. The brightness decrease can be suppressed because compensation by the dot arrangement does not change the total number of dots.

<Filter Formation Method>

Figure 3:
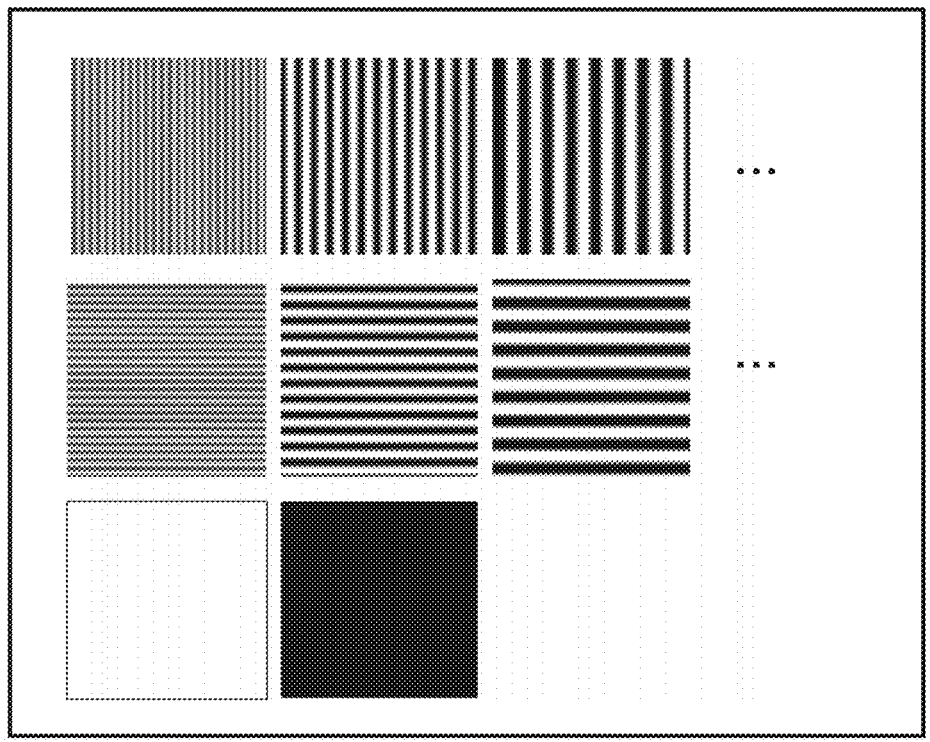
FIG. 3 is a view showing an example of a measurement chart.

In the following description, a method of forming the all-frequency recovery filter and lower-frequency recovery filter will be explained. First, a sharpness measurement chart is output by using an image forming apparatus as a target of filter designing. Note that the sharpness recovery processing is not performed when this measurement chart is output. FIG. 3 is a view showing an example of the measurement chart. The measurement chart is an image chart including a plurality of sine-wave pattern images different in frequency and direction, and uniform pattern images (for example, a solid white image and solid black image).

Based on the obtained information, a frequency response value P(u) of the image forming apparatus is calculated. As the frequency response value P(u), a modulation transfer function (MTF) calculated by using, for example, the following equation can be used:

$$p(u)=c(u)/c' \qquad (1)$$

where u is the frequency of the sine-wave pattern image represented by:

$$C(u)=\{Max(u)-Min(u)\}/\{Max(u)+Min(u)\}$$

$$C'=(White-Black)/(White+Black)$$

where

Max(u) is the maximum brightness of the sine-wave pattern image, which changes at the frequency u Min(u) is the minimum brightness of the sine-wave pattern image, which changes at the frequency u Each of White and Black is the brightness of the uniform pattern image The calculation of the modulation transfer function is, of course, not limited to equation (1) described above, and it is also possible to use, for example, equation (1'):

$$P(u) = \{Max(u) - Min(u)\}/(White - Black) \tag{1'}$$

Note that the frequency response value P(u) is calculated by using Max(u), Min(u), White, and Black as the brightness in this embodiment, but it can also be calculated by using, for example, the luminance, the density, and the device RGB value of a measurement device.

Furthermore, the frequency characteristic P(u) may also be obtained by using rectangular-wave pattern images, instead of the sine-wave pattern images as shown in FIG. 3, as the measurement chart. In this case, the value of a contrast transfer function (CTF) calculated by applying equation (1) to the rectangular-wave pattern images is used as the frequency characteristic P(u). Alternatively, an MTF value obtained by converting the CTF value by using a known Coltman's correction formula may also be used as the frequency characteristic P(u).

Next, frequency characteristic Ra(u)=1/P(u) of the all-frequency recovery filter is calculated based on the spatial frequency characteristic P(u). FIG. 4 is a graph for explaining the frequency characteristics of the filters. More specifically, FIG. 4 shows examples of P(u) and Ra(u). Ra(u) becomes a strong response in a higher-frequency region where the value of u is large. On the other hand, the frequency characteristic Rl(u) of the lower-frequency recovery filter is generated by correcting Ra(u) such that a response at a predetermined frequency ub or higher is almost flat. The predetermined frequency ub is freely settable. Finally, the coefficients of the all-frequency recovery filter and lower-frequency recovery filter are calculated by performing inverse Fourier transform on the frequency characteristics Ra(u) and Rl(u).

<Details of Halftone Processing (Step S207)>

Figure 6:
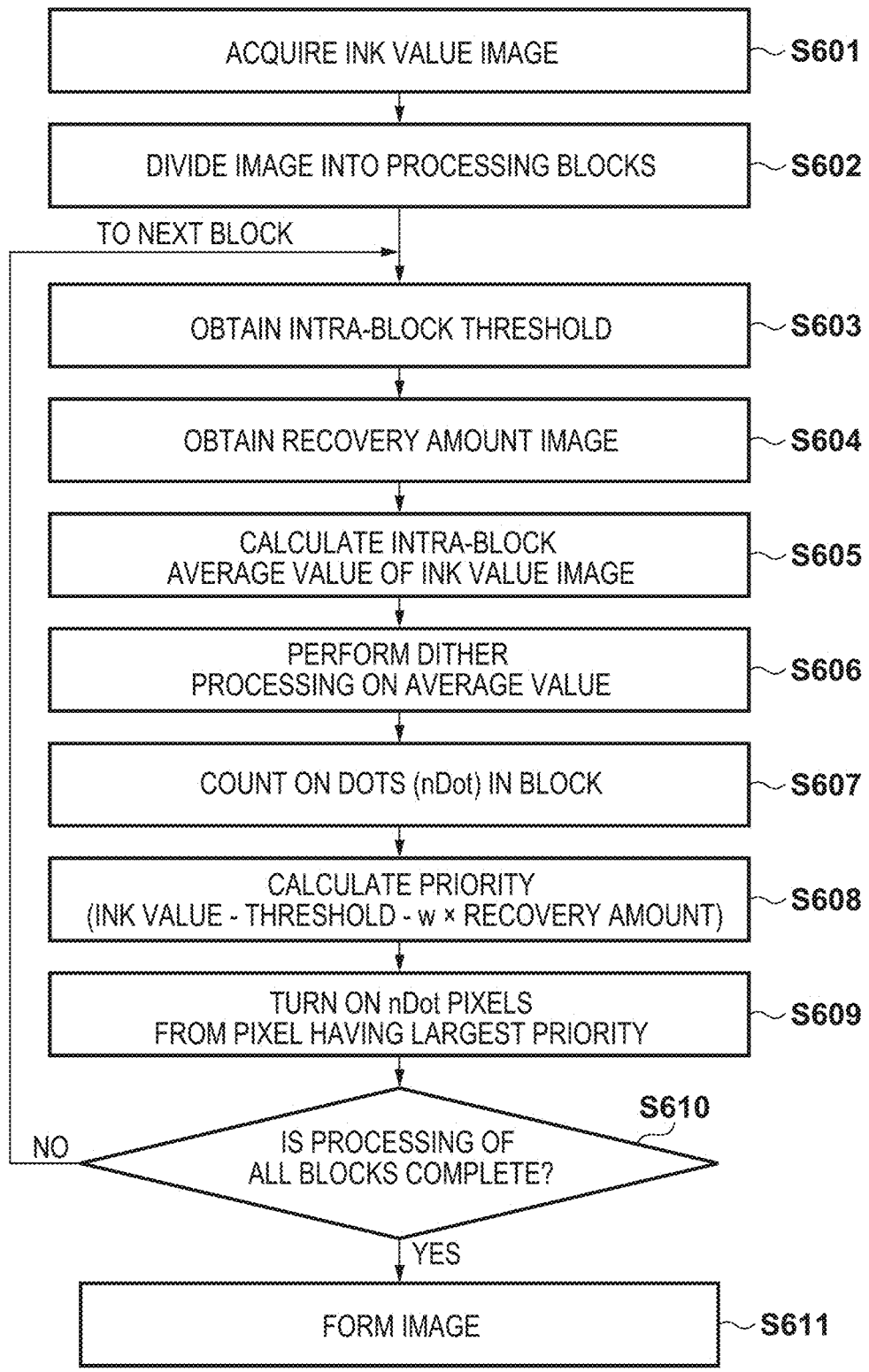
FIG. 6 is a flowchart of halftone processing in the first embodiment.
Figure 7:
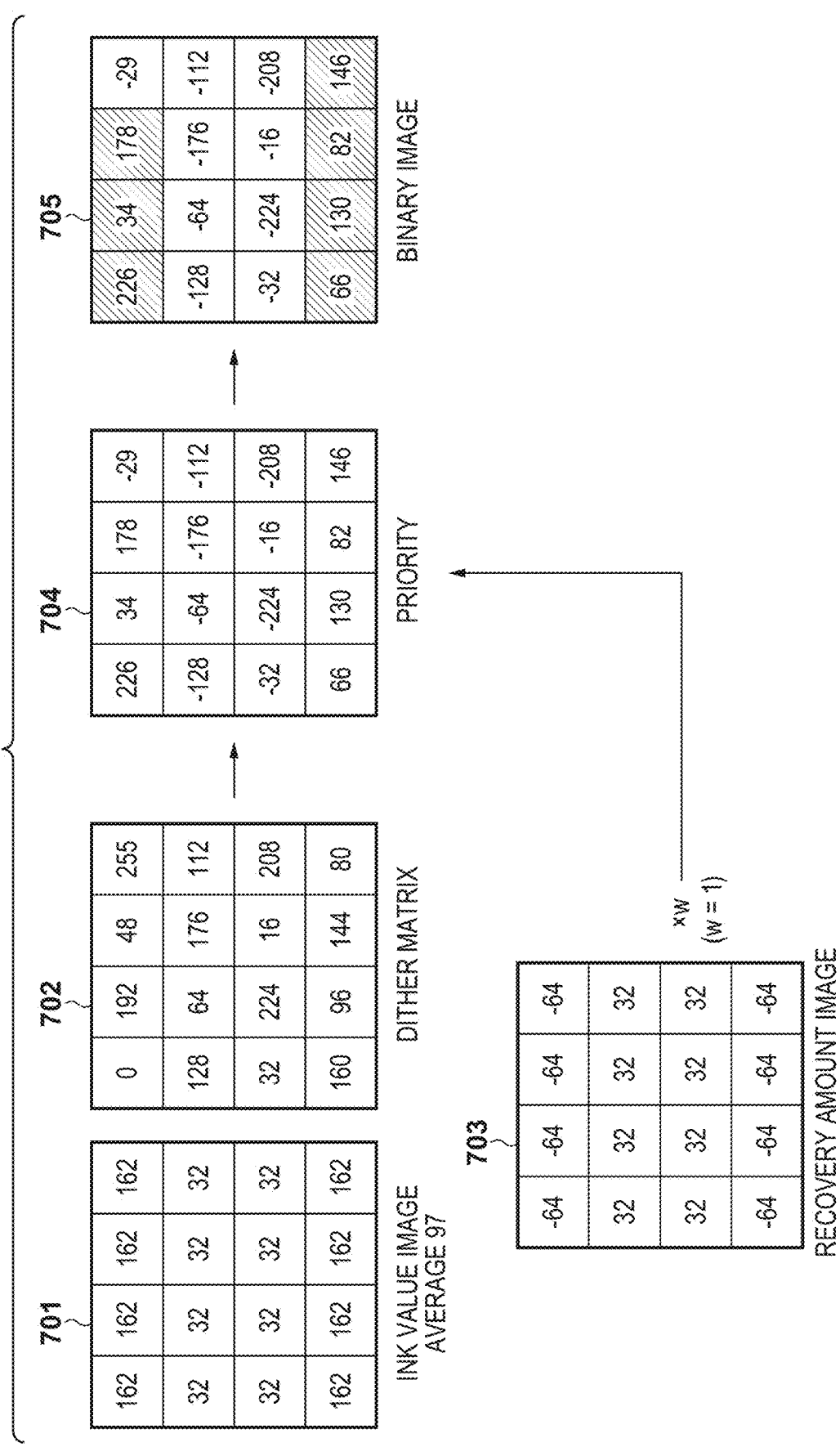
FIG. 7 is a schematic view for explaining the halftone processing in the first embodiment.

FIG. 6 is a flowchart of the halftone processing in the first embodiment. FIG. 7 is a schematic view for explaining the halftone processing in the first embodiment. In step S601, the halftone processor 108 obtains an ink value image having undergone lower-frequency recovery from the OPG processor 106. In step S602, the ink value image is divided into processing blocks. In this embodiment, the halftone processing is performed for each block which is a rectangular region containing 4 pixels×4 pixels. Following steps S603 to S609 are performed for each block. An image 701 indicates an example of the ink value image divided into the block. As can be understood from the ink value of each pixel in the image 701, horizontal edges exist in the uppermost and lowermost portions in the block of the image 701.

In step S603, the halftone processor 108 obtains thresholds for generating a binary image. In this embodiment, thresholds are obtained for each block of 4 pixels×4 pixels from a threshold matrix having a size of 256 pixels×256 pixels stored in the dither matrix storage unit 109. The threshold matrix has a characteristic called blue noise, and each threshold is expressed by an 8-bit value in accordance with an input image. An image 702 indicates examples of the thresholds obtained for each block.

In step S604, the halftone processor 108 obtains a recovery amount image for each 4-pixel×4-pixel block from the recovery amount image generator 112. An image 703 indicates an example of the recovery amount image obtained for each block.

In step S605, the halftone processor 108 calculates the average value of the ink value image in the block. In the example of the image 701, the average value is "97". In step S606, the halftone processor 108 performs dither processing on the average value. In this dither processing, quantization is performed by comparing the threshold of each pixel in the threshold group with one average value. If the pixel value is larger than the threshold, the dot is ON (a valid dot); otherwise, the dot is OFF. With respect to the average value "97", dots are ON in seven pixels having thresholds "0", "16", "32", "48", "64", "80", and "96" in the image 702. In step S607, the halftone processor 108 counts the ON dots (nDot) in the block. In the example shown in FIG. 7, nDot=7 because dots are ON in the seven pixels as described above.

In step S608, the halftone processor 108 changes the arrangement priority of each pixel. More specifically, a changed arrangement priority is calculated by "ink value−threshold−w×recovery amount" by using a weight parameter "w". In this embodiment, w=1 is used. An image 704 indicates examples of the calculated arrangement priorities.

In step S609, the halftone processor 108 generates a binary image by turning on "nDot" pixels in order from a pixel having the largest arrangement priority. An image 705 indicates an example of the binary image generated by this processing. That is, seven pixels having priority "226" to priority "34" in the image 704 are turned on because nDot=7 in the example shown in FIG. 7.

In step S610, the halftone processor 108 determines whether the binarization processing of all blocks is complete. If YES in step S610, the halftone processor 108 terminates the halftone processing, and starts the image formation processing. If NO in step S610, the halftone processor 108 returns to step S603, and processes the next block.

<Effect>

Figure 8:
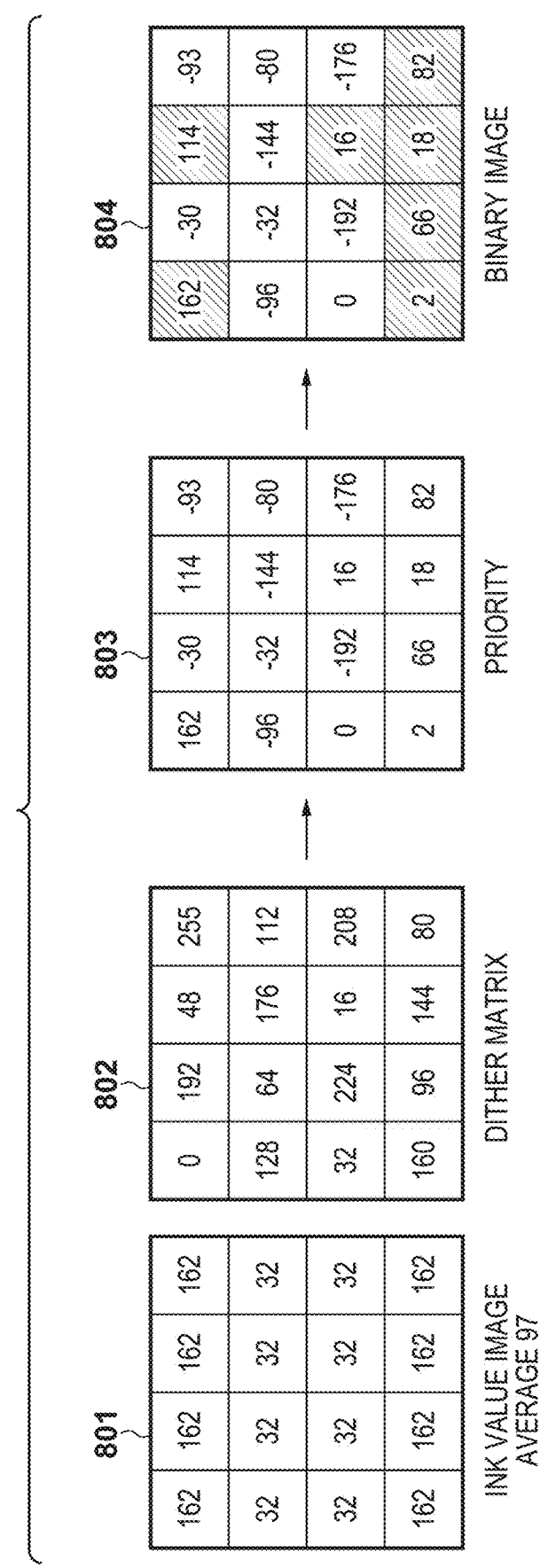
FIG. 8 is a schematic view for explaining halftone processing when using no recovery amount.

An effect of using the above-described "recovery amount" in the halftone processing will be explained below. FIG. 8 is a schematic view for explaining halftone processing when using no recovery amount. Images 801 and 802 are similar to the images 701 and 702, that is, the average value of an ink value image is "97", and the number of dots (nDot) is 7.

As can be understood from images 803 and 804, however, the positions of upper seven pixels having higher priorities are different because no recovery amount is used. More specifically, a dot is ON in a pixel having priority "16". This pixel is a pixel having a positive recovery amount. A pixel having a positive recovery amount is a pixel to be reproduced brightly (to have a high luminance) in order to compensate for higher-frequency components. If a dot is generated in this pixel (if the pixel is reproduced darkly), the sharpness degrades.

Accordingly, the first embodiment implements a suitable dot arrangement which suppresses the sharpness degradation of higher-frequency components by controlling the dot generation order in accordance with the recovery amount. In addition, adjustment corresponding to the frequency degradation characteristic of a printer can be performed by controlling the recovery intensity by using the weight parameter w.

Note that when the ink value image is an image having undergone the OPG processing, the brightness decrease caused by the output gamma correction processing described above can be avoided, so the same effect can be expected even in a configuration which adds the recovery amount to the ink value image. In this case, however, when performing the processing for each block, the total recovery amount is not zero in some cases depending on the way the block hits an image pattern. As a consequence, the average value of the ink value image varies and the number of dots increases or decreases in some cases. The influence is especially conspicuous when the value of the weight parameter w is increased. Since the increase/decrease in the number of dots increases, a problem such as a density variation may arise. Accordingly, the first embodiment adopts a configuration which does not apply the recovery amount to the ink amount (the image 701) itself, but uses the recovery amount in the calculation of the priority (the image 704).

<Feature of the Recovery Amount Image>

Note that "the recovery amount" as the pixel value of each pixel of the recovery amount image (the image 703) is "an excess/shortage distribution of compensation" after arbitrary frequency recovery processing is performed, and is an amount having a concept different from the edge amount obtained by so-called edge detection. Unlike a known Laplacian filter, therefore, it is possible to compensate for arbitrary frequency degradation in a portion other than the edge portion.

A concept closest to the recovery amount is a method called DoG (Difference of Gaussian). In DoG an edge position can be detected by blurring an input image by an arbitrary Gaussian filter, and calculating the difference from the input image. If DoG is simply applied as the recovery amount, however, no appropriate recovery amount is guaranteed because the recovery amount depends on the shape of a Gaussian filter. On the other hand, the processing of the above-described configuration uses "the sharpness degradation characteristic after the lower-frequency components are recovered". This makes it possible to obtain a more appropriate recovery amount matching the sharpness degradation characteristic.

In the first embodiment as explained above, only a lower-frequency region is compensated for by the lower-frequency recovery filter, and a higher-frequency region is compensated for by the dot arrangement. This makes it possible to suitably recover the sharpness while suppressing the brightness decrease in a higher-frequency region. Especially when using the above-described recovery amount image, it is possible to suitably recover the sharpness of higher-frequency components while suppressing the increase in arithmetic operation load.

(Modifications)

Note that the example in which the difference image between the lower-frequency-compensated image data and all-frequency-compensated image data is directly used as the recovery amount image has been explained above, but it is also possible to use a configuration which indirectly uses the recovery amount image by processing it. For example, it is also possible to use an arbitrary upper-limit value, and clip a recovery amount equal to or larger than this upper-limit value to a predetermined value. In this case, a lower-contrast region is relatively strongly corrected.

Also, the example which implements frequency recovery of a lower frequency and all frequencies by convoluting the filter to the luminance value of an input image has been explained, but it is also possible to use a value other than the luminance value, for example, the brightness. In addition, the method of sharpness recovery is not limited to the method using the filter, and an arbitrary method such as Fourier transform may also be used.

Furthermore, the example using inks of four colors, that is, C, M, Y, and K is disclosed as the configuration of the printhead 201, but the types of inks are not limited. It is also possible to use light ink having a low density, spot color inks such as red and green, and white ink. Clear ink which is colorless and transparent and metallic ink may also be used. The present invention is also applicable to a configuration capable of controlling the discharge amount of ink to be discharged from the printhead 201.

An input image is an RGB color image in this embodiment, but the image type is not limited, and a monochrome image or CMYK image may also be used. An image may also contain information other than a color, for example, an image may also contain gloss information. In addition, the numbers of bits and the numbers of grids of the various LUTs and an inter-grid interpolation method are arbitrary. Likewise, the numbers of bits and the sizes of the various filters and dither matrix are arbitrary.

Also, the example in which the pass mask is used in the pass separation processing by the pass separation processor 206 is disclosed, but the method of the pass separation processing is not limited. For example, the present invention is also applicable to a form in which the color separation processor 104 generates multivalued images matching the number of passes, and the halftone processor 108 binarizes the images. In addition, the number of passes is arbitrary, and one-pass printing may also be performed without using the multipass method.

Second Embodiment

The second embodiment will be explained by taking a printer (a so-called multifunction apparatus) including a document reader (scanner). In particular, a form in which a recovery amount image is generated from the frequency degradation characteristic of the document reader in a document copying process and the dot arrangement is controlled by using the recovery amount image in halftone processing will be explained.

That is, in the above-described first embodiment, it is assumed that the frequency degradation characteristic of a printer is known. However, the frequency degradation characteristic of a printer changes in accordance with a printing medium and is not always known. Therefore, the second embodiment uses the frequency degradation characteristic of the document reader. Note that an explanation of the same portions as those of the first embodiment will be simplified or omitted.

<Apparatus Configuration>

Figure 9:
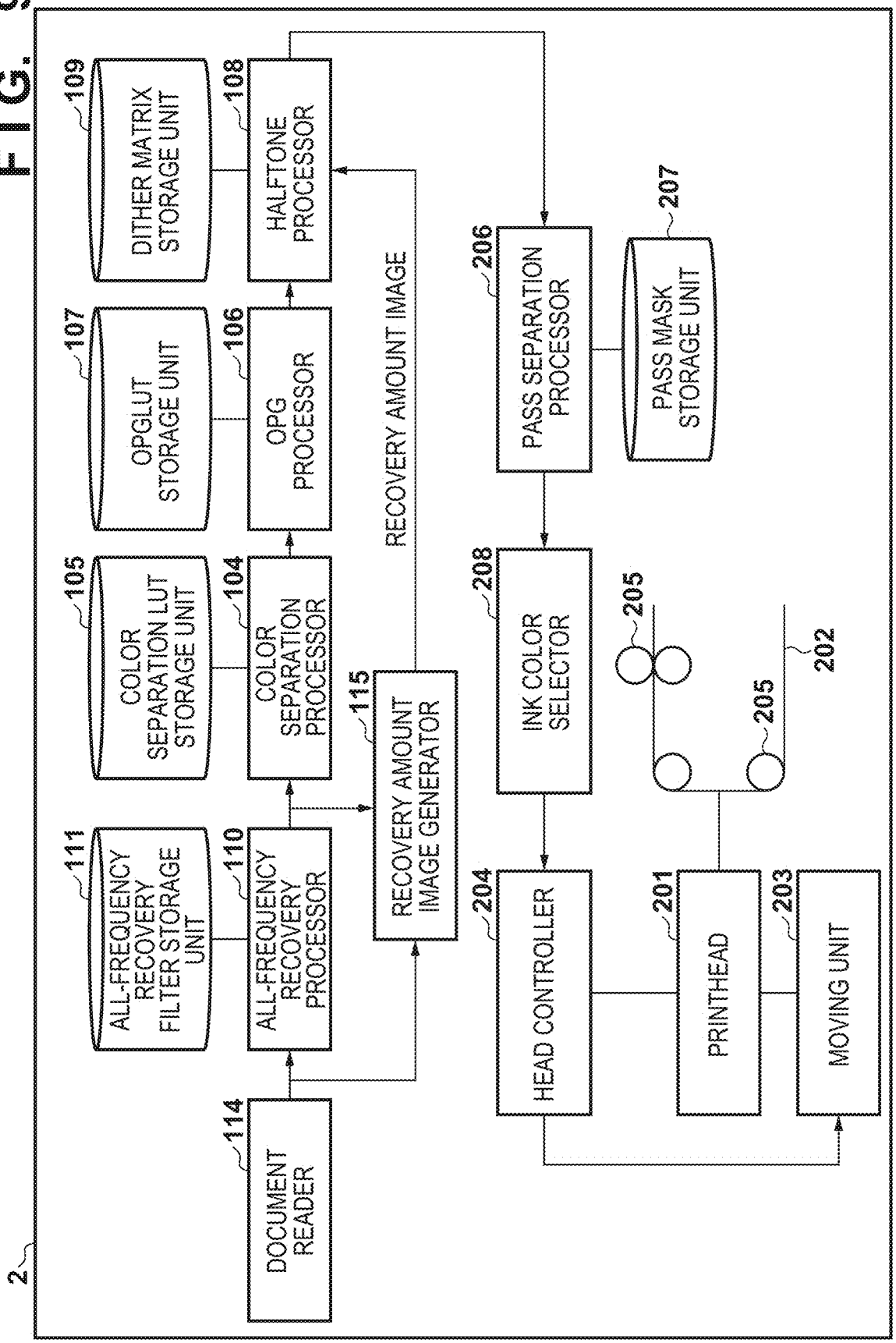
FIG. 9 is a block diagram showing the configuration of an image forming apparatus according to the second embodiment.

FIG. 9 is a block diagram showing the configuration of an image forming apparatus according to the second embodiment. As described above, a printer 2 includes a document reader 114, and also includes an image processing apparatus 1 shown in FIG. 1. The document reader 114 reads a document to be copied and generates image data. In this embodiment, the generated image data is an RGB color image having eight bits for each color.

An all-frequency recovery processor 110 performs all-frequency recovery processing on the input RGB image data. An all-frequency recovery filter is designed based on the frequency degradation characteristic of the document reader. The processed image is transmitted to a color separation processor 104 and a recovery amount image generator 115.

The recovery amount image generator 115 generates a recovery amount image to be used in halftone processing. More specifically, a recovery amount image is generated by calculating the difference between the image data processed by the all-frequency recovery processor 110 and the input RGB image data. The generated recovery amount image is transmitted to a halftone processor 108.

<Details of Halftone Processing>

Figure 10:
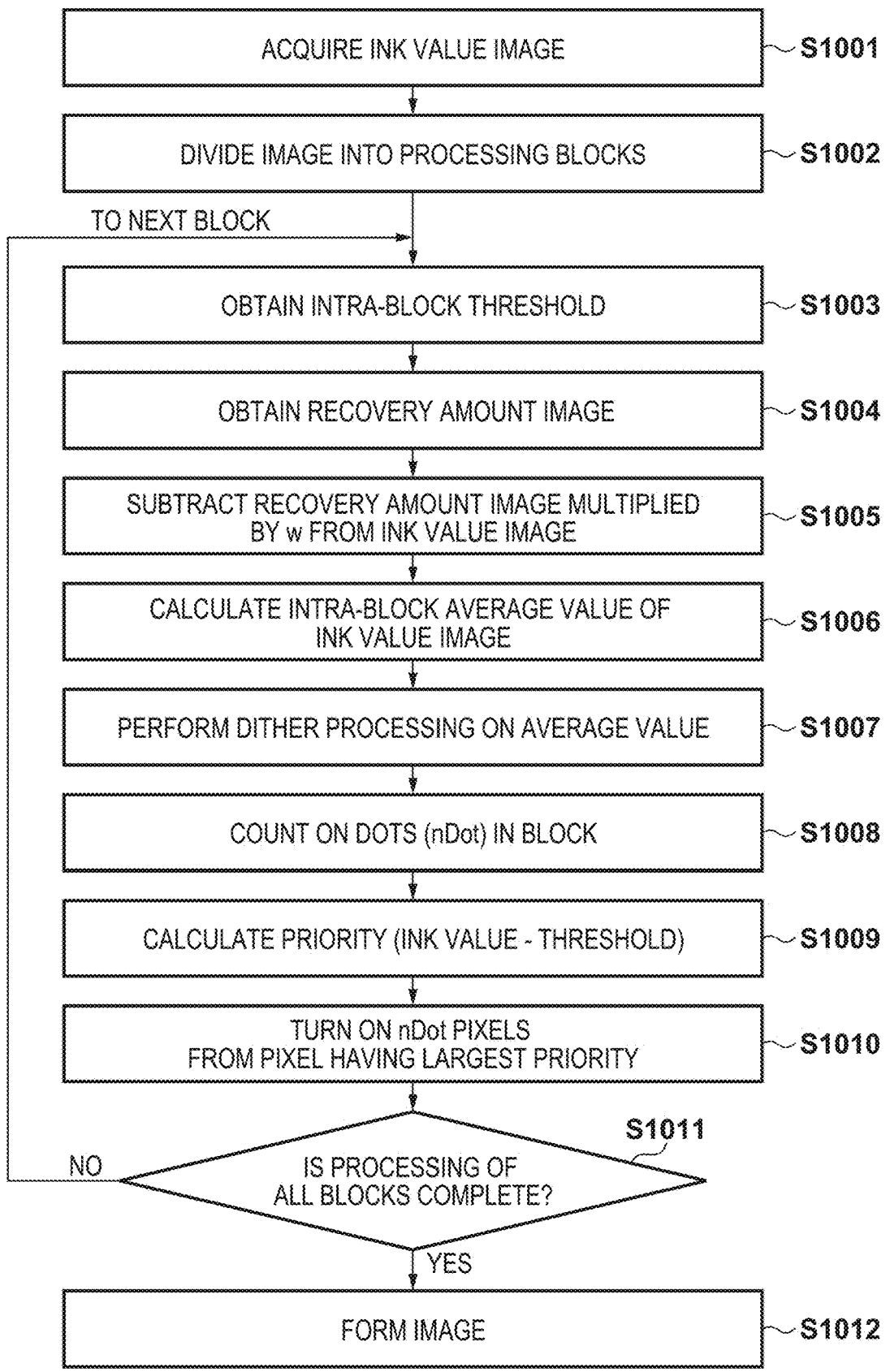
FIG. 10 is a flowchart of halftone processing in the second embodiment.

FIG. 10 is a flowchart of the halftone processing in the second embodiment. The differences from the halftone processing of the first embodiment are ink value image correction processing in step S1005, and a priority calculation method in step S1009. More specifically, in step S1005, a subtracted image is generated by subtracting a recovery amount image multiplied by w from an ink value image by using a weight parameter w. In this embodiment, w=1. On the other hand, the priority is calculated (in step S1009) by "ink value−threshold" without using any recovery amount.

As described above, the second embodiment adopts the configuration which calculates the priority without using any recovery amount and subtracts the recovery amount image multiplied by w from the ink value image. When the size of a block is as small as 4×4, it is difficult to perform recovery to lower-frequency components only by controlling the dot arrangement in the block, so dot control in a broader range is required. Therefore, the number of dots between blocks is adjusted by subtracting the recovery amount multiplied by w from the ink value image, thereby performing compensation to lower-frequency components.

<Effect>

In the second embodiment, the dot arrangement is controlled by using the recovery amount image obtained based on the frequency degradation characteristic of the document reader, instead of the frequency degradation characteristic of the image forming unit. This is so because the recovery amount image generated from the characteristic of the document reader has properties similar to those of a recovery amount image generated from the characteristic of the image forming unit.

Figure 11:
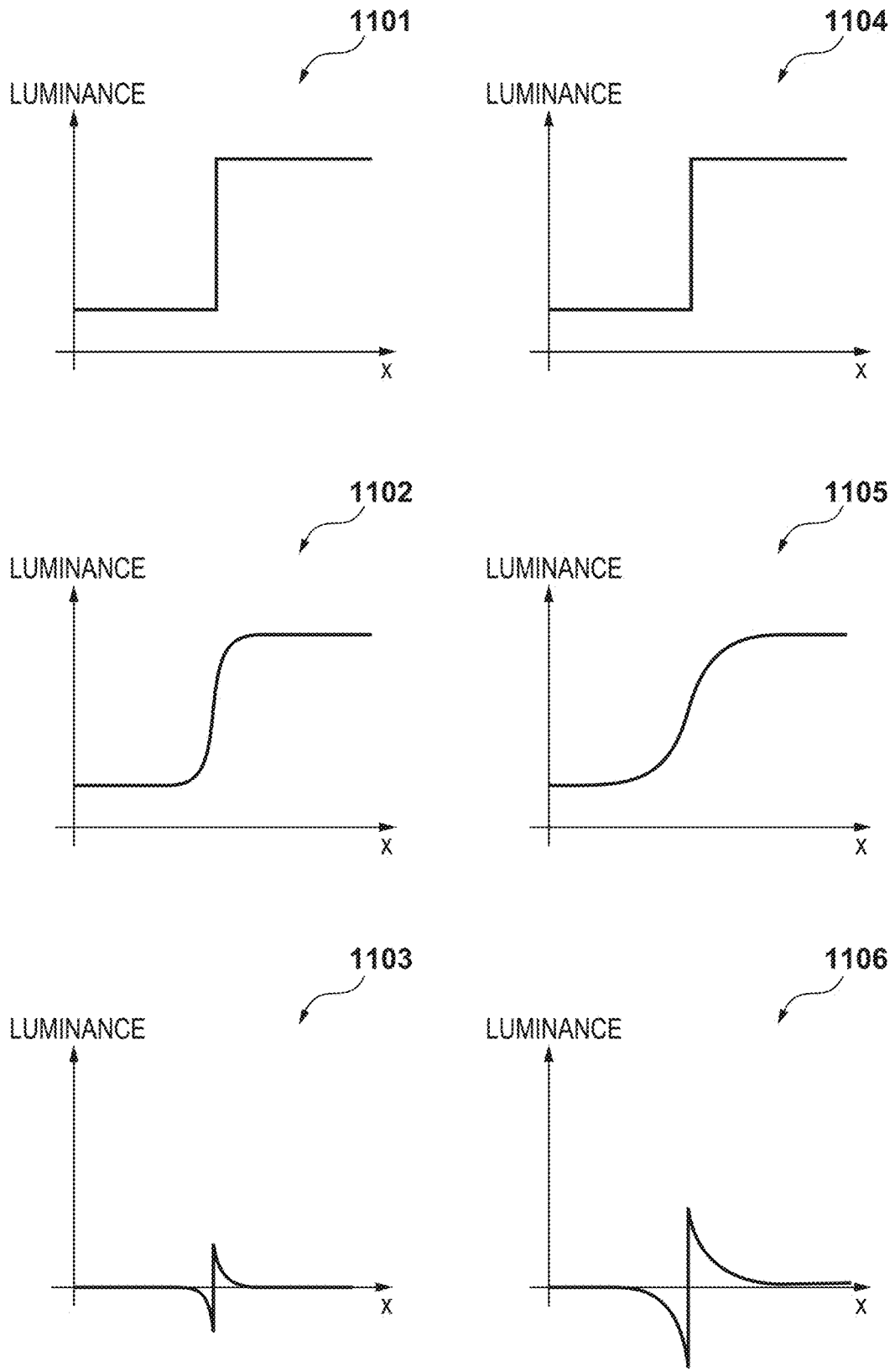
FIG. 11 is a view for explaining the similarity of recovery amount images.

FIG. 11 is a view showing the similarity between the recovery amount images. A graph 1101 is a graph plotting a pixel position x on the abscissa and a luminance on the ordinate, and shows a one-dimensional step edge. A graph 1102 shows a step edge blurred by a given frequency degradation characteristic (for example, the characteristic of the image forming unit). In this case, the recovery amount is the difference between the graphs 1101 and 1102, and is data whose sign is inverted in the edge portion as shown in a graph 1103. On the other hand, a graph 1105 shows a step edge obtained by blurring a step edge shown in a graph 1104 by a frequency degradation characteristic (for example, the characteristic of the document reader) different from the above-described characteristic. A graph 1106 shows the recovery amount.

Comparison of the graph 1103 with the graph 1106 reveals that the shapes can be regarded as almost similar although the scales of values are different. That is, it is understood that the recovery amount of the document reader can be used as the recovery amount of the image forming unit by adjusting the intensity of recovery. In particular, a suitable effect is obtained by even the above-described configuration because the recovery intensity can be controlled by using the weight parameter w.

In the second embodiment as explained above, the dot arrangement is controlled by using the recovery amount image obtained from the frequency degradation characteristic of the document reader. This makes it possible to suitably recover the sharpness while suppressing the brightness decrease in a higher-frequency region.

(Modifications)

In the above-described embodiment, an example of the halftone processing in which the number of dots in a block is calculated and then the dot arrangement is determined based on the priority has been explained. However, a practical method of implementing the halftone processing is arbitrary. For example, it is possible to use general dither processing or a known error diffusion method.

Also, the example of subtracting the recovery amount image from the ink value image has been explained, but the recovery amount image may also be added to a threshold. In this case, a threshold used in the dither processing in step S1007 and a threshold used in the priority calculation processing in step S1009 can be different. For example, it is possible to validate a process of adding the recovery amount image to a threshold only when calculating the priority.

Third Embodiment

In the third embodiment, a form in which processing is performed more suitably when an input image contains thin lower-density lines (thin white lines) will be explained. That is, a thin lower-density line on a higher-density background sometimes blurs due to the influence of dot smear in image formation processing. This can similarly occur even when performing the processing of the first embodiment. In the third embodiment, therefore, an example which suppresses the blur of a thin lower-density line on a higher-density background by processing a recovery amount image will be explained. Note that the configuration of an image forming system according to the third embodiment is almost the same as that of the first embodiment shown in FIG. 1, except processing of a recovery amount image generator 112. An explanation of the same portions as those of the first embodiment will be simplified or omitted.

First, the recovery amount image generator 112 calculates the difference between image data corrected by a lower-frequency recovery processor 102 and image data corrected by an all-frequency recovery processor 110, thereby generating a higher-frequency-component recovery amount image.

After that, the recovery amount image generator 112 performs thin white line detection processing on the higher-frequency recovery amount image. A thin white line means a thin line narrower than a predetermined width and lighter than a predetermined density. In this embodiment, three pixels which continue in the horizontal direction or vertical direction and have recovery amounts which change "negative", "positive", and "negative" are detected. That is, three consecutive pixels arranged in the order of "too bright", "too dark", and "too bright" are detected.

Then, the recovery amount image generator 112 multiplies, by "−w", the recovery amount of a pixel contained in the detected thin white line and having a negative recovery amount. That is, the sign of the recovery amount of the too-bright pixel is inverted. The corrected recovery amount image is transmitted to a halftone processor 108.

<Effect>

In the third embodiment as explained above, the recovery amount of a pixel contained in a thin white line and having a negative recovery amount is multiplied by "−w". As a consequence, a higher-density background adjacent to the thin white line is positively corrected, so a dot is hardly arranged on the background. This makes it possible to suppress a blur of the thin white line caused by dot smear.

Note that it is also possible to correct the recovery amount of a feature portion other than a thin line. For example, it is possible to determine that two consecutive pixels in which the sign of the recovery amount is inverted are edge pixels, and set "0" as the recovery amount of a pixel other than the edge pixels. This makes it possible to recover the sharpness more suitably while suppressing the influence of dot smear.

Fourth Embodiment

In the fourth embodiment, a form in which the resolution of a document reader is used in the same manner as in the second embodiment will be explained. The difference from the second embodiment is that the resolution of an image obtained by the document reader and the resolution of image processing in an image forming unit are different. An explanation of the same portions as those of the second embodiment will be simplified or omitted.

<Apparatus Configuration>

FIG. 12 is a block diagram showing the configuration of an image forming apparatus according to the fourth embodiment. As in the second embodiment, a printer 2 includes a document reader. The printer 2 obtains image data to be copied from a document reader 114. In this embodiment, the resolution of the image data obtained by the document reader is 2400×2400 dpi, and the processing resolution of an image forming unit after a color separation processor 104 is 1200×1200 dpi.

An all-frequency recovery processor 110 performs all-frequency recovery processing on the input image data. The processed image is transmitted to a recovery amount image generator 115 and an image reduction processor 116.

The recovery amount image generator 115 generates a recovery amount image by calculating the difference between the image data processed by the all-frequency recovery processor 110 and the image data obtained by the document reader. The generated recovery amount image is transmitted to the image reduction processor 116.

The image reduction processor 116 executes enlargement/reduction processing (in this embodiment, reduction processing) on the image having undergone the all-frequency recovery processing and the recovery amount image. In this processing, a reduction method for the image having undergone the all-frequency recovery processing and a reduction method for the recovery amount image are different. Details of the reduction methods will be described later. The reduced images are transmitted to the color separation processor 104 and halftone processor 108.

<Details of Image Reduction Processing>

The image reduction processor 116 reduces the image having undergone the all-frequency recovery processing by using a known bilinear method. Since a 2400×2400-dpi image is converted into a 1200×1200-dpi image, the pixel value after the reduction is the average value of 2×2 pixels before the reduction. When the resolution is N times and enlargement/reduction is performed to 1/N times, the pixel value is the average value of N×N pixels.

On the other hand, the total value of 2×2 pixels is first calculated for the recovery amount image. If this total value is 0 or more, a maximum value of the 2×2 pixels is used as the pixel value after the reduction. If the total value is less than 0, a minimum value of the 2×2 pixels is used as the pixel value after the reduction. This is so because if the average value of recovery amounts is used in an edge portion, a positive recovery amount and negative recovery amount cancel each other out.

<Effect>

In the fourth embodiment as explained above, the sharpness can suitably be recovered even when a printer includes a document reader which reads a document at a resolution different from the resolution of image processing (halftone processing).

(Modifications)

Note that the example using the bilinear method and maximum value (minimum value) as the reduction processing for the image having undergone the all-frequency recovery processing has been explained above, but the image reduction method is not limited. In addition, an arbitrary reduction method is applicable as the reduction processing for the recovery amount image, provided that a positive recovery amount and negative recovery amount do not cancel each other out.

Note also that the embodiment has been explained by using the example in which the resolution of the image data obtained by the document reader is 2400×2400 dpi and the processing resolution of the image forming unit after the color separation processor 104 is 1200×1200 dpi, but these resolutions are arbitrary. The magnitude relationship between the resolutions is also arbitrary, and an image enlargement processing is performed instead of the image reduction processing when the resolution of the document reader is relatively low.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126513, filed Jun. 28, 2017, which is hereby incorporated by reference herein in its entirety.

What is claimed is:

1. An image processing apparatus for generating, based on an input image, a halftone image to be provided to an image forming unit which forms an image on a printing medium, comprising:

a first recovery processing unit configured to perform, on the input image, a first recovery processing for compensating for sharpness degradation of a lower-frequency component lower than a predetermined frequency in an image formed by the image forming unit;

a second recovery processing unit configured to perform, on the input image, a second recovery processing for compensating for sharpness degradation of an all-frequency component in the image formed by the image forming unit;
a generating unit configured to generate a difference image between an input image having undergone the first recovery processing and an input image having undergone the second recovery processing, as a recovery amount image; and
a halftone processing unit configured to generate, based on the recovery amount image, the halftone image by performing halftone processing on the input image having undergone the first recovery processing,
wherein the halftone processing unit controls a dot easiness of each pixel by referring to the recovery amount image, and
wherein the first recovery processing unit, the second recovery processing unit, the generating unit, and halftone processing unit are implemented by at least one processor and at least one memory.

2. The image processing apparatus according to claim 1, wherein
the halftone processing unit determines whether to arrange a dot in each pixel for each predetermined region of the input image having undergone the recovery processing, and
the halftone processing unit controls the halftone processing for at least one pixel in the predetermined region, such that a dot is formed more hardly when values corresponding to the predetermined region of the recovery amount image indicates that the at least one pixel is to be brightened, than when values corresponding to the predetermined region of the recovery amount image indicates that the at least one pixel is to be darkened.

3. The image processing apparatus according to claim 1, wherein the generating unit further detects a thin line narrower than a predetermined width and lighter than a predetermined density in the difference image, and generates the recovery amount image by inverting a sign of a value corresponding to the detected thin line, in the difference image.

4. The image processing apparatus according to claim 1, wherein the halftone processing unit calculates an arrangement priority of a dot in each pixel contained in a predetermined region of the input image having undergone the recovery processing, based on a value corresponding to the pixel contained in the predetermined region in the recovery amount image, and determines whether to turn on or off the dot in the pixel contained in the predetermined region in accordance with the arrangement priority.

5. The image processing apparatus according to claim 1, wherein the halftone processing unit calculates an arrangement priority of a dot in each pixel contained in a predetermined region of the input image having undergone the recovery processing, based on a pixel value of the pixel contained in the predetermined region, and performs the halftone processing by changing the arrangement priority based on a value corresponding to the pixel contained in the predetermined region in the recovery amount image.

6. The image processing apparatus according to claim 1, wherein the halftone processing unit performs the halftone processing on the input image having undergone the first recovery processing, by changing an arrangement priority of a valid dot based on the recovery amount image.

7. The image processing apparatus according to claim 1, further comprising an obtaining unit configured to obtain a frequency degradation characteristic of a reading unit which reads a document and generates the input image,
wherein the recovery processing unit performs, on the input image, recovery processing for compensating for sharpness degradation of an all-frequency component in the image formed by the image forming unit, by using the frequency degradation characteristic, and
the generating unit generates a difference image between the input image and an input image having undergone the recovery processing, as a recovery amount image indicating a recovery amount.

8. The image processing apparatus according to claim 7, further comprising an enlarging/reducing unit configured to perform image enlarging/reducing processing,
wherein when the reading unit generates the input image by a first resolution and the halftone processing unit performs image processing by a second resolution different from the first resolution, the enlarging/reducing unit enlarges/reduces the input image and the recovery amount image such that the images have the second resolution, and the halftone processing unit performs the halftone processing on the input image enlarged/reduced by the enlarging/reducing unit, based on the recovery amount image enlarged/reduced by the enlarging/reducing unit.

9. The image processing apparatus according to claim 8, wherein when the first resolution is N times the second resolution, the enlarging/reducing unit calculates a total value of pixel values in an N×N-pixel region of the recovery amount image, when the total value is not less than 0, the enlarging/reducing unit determines that a maximum value of the pixel values in the region is a pixel value of the enlarged/reduced recovery amount image, and when the total value is less than 0, the enlarging/reducing unit determines that a minimum value of the pixel values in the region is the pixel value of the enlarged/reduced recovery amount image.

10. The image processing apparatus according to claim 7, wherein the halftone processing unit performs the halftone processing on a subtracted image obtained by subtracting the recovery amount image from the input image.

11. The image processing apparatus according to claim 1, wherein
the halftone processing unit has a dither matrix, calculates a number of dots in a predetermined region of the input image having undergone the recovery processing based on the dither matrix, and determines whether to arrange a dot of each pixel in the predetermined region such that dots matching the calculated number of dots are arranged in the predetermined region.

12. The image processing apparatus according to claim 11, wherein in a predetermined region of the input image having undergone the recovery processing, a dot arrangement priority of each pixel in the input image having undergone the recovery processing is calculated based on a pixel value of the pixel, a threshold corresponding to the pixel, and a value corresponding to the pixel in the recovery amount image, and dots matching the calculated number of dots are arranged in pixels having higher dot arrangement priorities.

13. The image processing apparatus according to claim 12, wherein the halftone processing unit calculates the dot arrangement priority of each pixel by subtracting a value obtained by multiplying the value in the recovery amount image by a weight, from a difference between the pixel value and the threshold, and a dot is arranged more preferentially as a value of the dot arrangement priority increases.

14. The image processing apparatus according to claim 1, wherein the recovery processing unit executes the recovery processing on the input image by using a previously held recovery filter.

15. The image processing apparatus according to claim 1, further comprising a color separation processing unit configured to convert the input image having undergone the recovery processing into an image corresponding to each coloring material of the image forming unit,
wherein the halftone processing unit executes the halftone processing on an image of each color output from the color separation processing unit.

16. The image processing apparatus according to claim 1, further comprising:
a color separation processing unit configured to convert the input image having undergone the recovery processing into an image corresponding to each coloring material of the image forming unit; and
an output gamma processing unit configured to execute output gamma processing on an image of each color output from the color separation processing unit,
wherein the halftone processing unit executes the halftone processing on an image of each color output from the output gamma processing unit.

17. An image processing method of generating, based on an input image, a halftone image to be provided to an image forming unit which forms an image on a printing medium, comprising:
performing, on the input image, a first recovery processing for compensating for sharpness degradation of a lower-frequency component lower than a predetermined frequency in an image formed by the image forming unit;
performing, on the input image, a second recovery processing for compensating for sharpness degradation of an all-frequency component in the image formed by the image forming unit;
generating a difference image between an input image having undergone the first recovery processing and an input image having undergone the second recovery processing, as a recovery amount image;
generating, based on the recovery amount image, the halftone image by performing halftone processing on the input image having undergone the first recovery processing; and
controlling a dot easiness of each pixel by referring to the recovery amount image.

18. A non-transitory computer-readable recording medium storing a program that causes a computer to function as an image processing apparatus for generating, based on an input image, a halftone image to be provided to an image forming unit which forms an image on a printing medium, the image processing apparatus comprising:
a first recovery processing unit configured to perform, on the input image, a first recovery processing for compensating for sharpness degradation of a lower-frequency component lower than a predetermined frequency in an image formed by the image forming unit;
a second recovery processing unit configured to perform, on the input image, a second recovery processing for compensating for sharpness degradation of an all-frequency component in the image formed by the image forming unit;
a generating unit configured to generate a difference image between an input image having undergone the first recovery processing and an input image having undergone the second recovery processing, as a recovery amount image; and
a halftone processing unit configured to generate, based on the recovery amount image, the halftone image by performing halftone processing on the input image having undergone the first recovery processing,
wherein the halftone processing unit controls a dot easiness of each pixel by referring to the recovery amount image, and
wherein the first recovery processing unit, the second recovery processing unit, the generating unit, and halftone processing are implemented by at least one processor and at least one memory of the computer.

19. An image processing apparatus for generating, based on an input image, a halftone image to be provided to an image forming unit which forms an image on a printing medium, comprising:
a recovery processing unit configured to perform, on the input image, recovery processing for compensating for sharpness degradation in an image formed by the image forming unit;
a generating unit configured to generate a recovery amount image by using the input image having undergone the recovery processing; and
a halftone processing unit configured to generate, based on the recovery amount image, the halftone image by performing halftone processing on the input image having undergone the recovery processing,
wherein the halftone processing unit has a dither matrix, calculates a number of dots in a predetermined region of the input image having undergone the recovery processing based on the dither matrix, and determines whether to arrange a dot of each pixel in the predetermined region such that dots matching the calculated number of dots are arranged in the predetermined region,
wherein in a predetermined region of the input image having undergone the recovery processing, a dot arrangement priority of each pixel in the input image having undergone the recovery processing is calculated based on a pixel value of the pixel, a threshold corresponding to the pixel, and a value corresponding to the pixel in the recovery amount image, and dots matching the calculated number of dots are arranged in pixels having higher dot arrangement priorities, and
wherein the recovery processing unit, the generating unit, and halftone processing are implemented by at least one processor and at least one memory.

20. An image processing method of generating, based on an input image, a halftone image to be provided to an image forming unit which forms an image on a printing medium, comprising:
performing, on the input image, recovery processing for compensating for sharpness degradation in an image formed by the image forming unit;
generating a recovery amount image by using the input image having undergone the recovery processing; and
generating, based on the recovery amount image, the halftone image by performing halftone processing on the input image having undergone the recovery processing;
calculating a number of dots in a predetermined region of the input image having undergone the recovery processing based on a dither matrix; and determining whether to arrange a dot of each pixel in the predetermined region such that dots matching the calculated number of dots are arranged in the predetermined region, wherein in a predetermined region of the input image having undergone the recovery processing, a dot arrangement priority of each pixel in the input image having undergone the recovery processing is calculated based on a pixel value of the pixel, a threshold corresponding to the pixel, and a value corresponding to the pixel in the recovery amount image, and dots matching the calculated number of dots are arranged in pixels having higher dot arrangement priorities.

21. A non-transitory computer-readable recording medium storing a program that causes a computer to function as an image processing apparatus for generating, based on an input image, a halftone image to be provided to an image forming unit which forms an image on a printing medium, the image processing apparatus comprising:

a recovery processing unit configured to perform, on the input image, recovery processing for compensating for sharpness degradation in an image formed by the image forming unit;

a generating unit configured to generate a recovery amount image by using the input image having undergone the recovery processing; and a halftone processing unit configured to generate, based on the recovery amount image, the halftone image by performing halftone processing on the input image having undergone the recovery processing, wherein the halftone processing unit has a dither matrix, calculates a number of dots in a predetermined region of the input image having undergone the recovery processing based on the dither matrix, and determines whether to arrange a dot of each pixel in the predetermined region such that dots matching the calculated number of dots are arranged in the predetermined region, wherein in a predetermined region of the input image having undergone the recovery processing, a dot arrangement priority of each pixel in the input image having undergone the recovery processing is calculated based on a pixel value of the pixel, a threshold corresponding to the pixel, and a value corresponding to the pixel in the recovery amount image, and dots matching the calculated number of dots are arranged in pixels having higher dot arrangement priorities, and wherein the recovery processing unit, the generating unit, and halftone processing are implemented by at least one processor and at least one memory of the computer.

* * * * *